(No Model.)
W. H. BRUCE.
HEATING DEVICE.
No. 582,261.        Patented May 11, 1897.
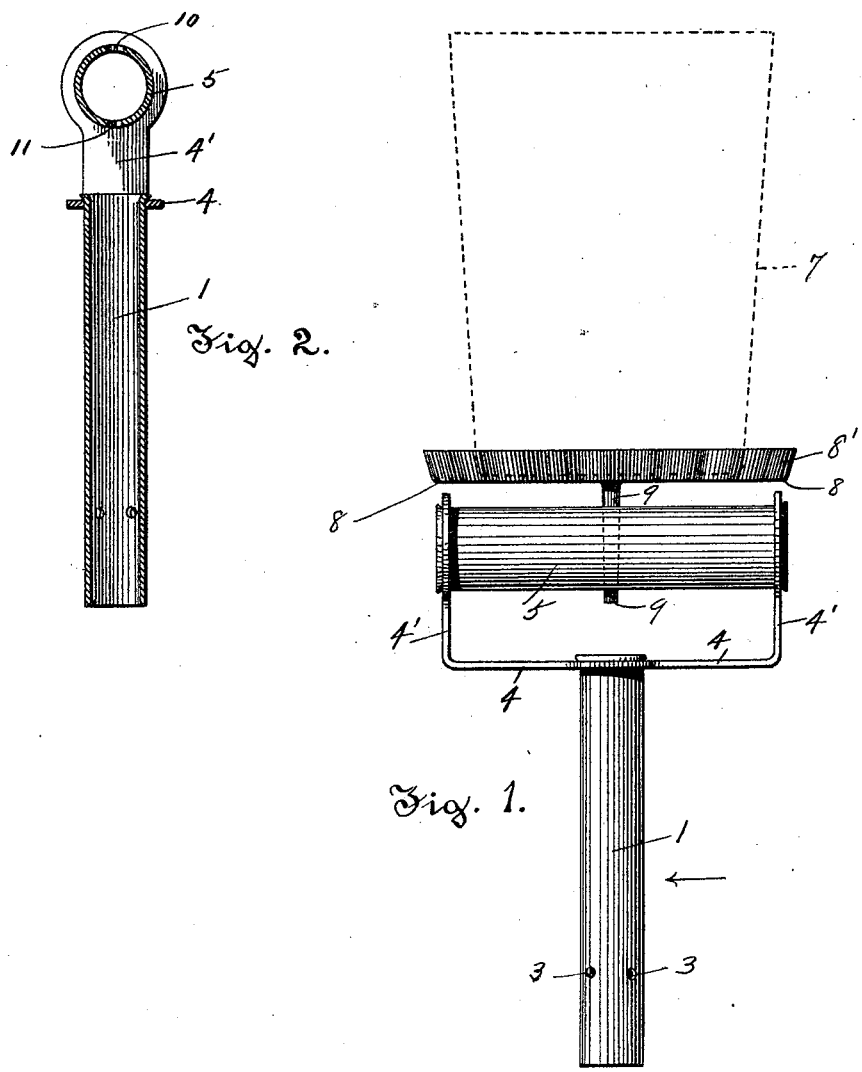
Witnesses
A. L. Whiting
M. J. Galvin
Inventor
W. H. Bruce
By his Attorney
John L. Dewey

UNITED STATES PATENT OFFICE.

WALTER H. BRUCE, OF WORCESTER, MASSACHUSETTS, ASSIGNOR TO HIMSELF AND LEWIS T. HOUGHTON, OF SAME PLACE.

HEATING DEVICE.

SPECIFICATION forming part of Letters Patent No. 582,261, dated May 11, 1897.

Application filed August 3, 1896. Serial No. 601,465. (No model.)

*To all whom it may concern:*

Be it known that I, WALTER H. BRUCE, a citizen of the United States, residing at Worcester, in the county of Worcester and State of Massachusetts, have invented certain new and useful Improvements in Heating Devices, of which the following is a specification.

My invention relates to a heating device which may be placed on an ordinary burner on a gas-fixture; and the object of my invention is to provide a heating device of simple and inexpensive construction which has a tube to hold curling-irons or other tools to be heated, and also has a plate or support above said tube to support a cup or glass to heat the contents thereof.

My invention consists in certain novel features of construction of my heating device, as will be hereinafter fully described.

Referring to the drawings, Figure 1 is a side view of my heating device; and Fig. 2 is a central vertical section through the heating device, looking in the direction of arrow, Fig. 1, with the cup-support removed.

In the accompanying drawings, 1 is a tube adapted at its lower end to fit over and be supported on the gas-burner (not shown) and provided with one or more openings 3 therein for the passage of air to produce the necessary draft. Upon the upper end of the tube 1 is secured a stand or support 4, which is made separate from and extends at right angles to the tube 1 and in a horizontal plane. The ends 4' of the support 4 are bent up at right angles to the main portion and provided with openings therein, into and through which the ends of a second tube 5 extend and are secured. The tube 5 extends above the tube 1 and at right angles thereto, so that the heat from the gas passing through the tube 1 will come in contact with and heat the tube 5.

In connection with the tube 5 I use a supplemental attachment for supporting a glass or cup 7 (see Fig. 1) and consisting of a disk or plate 8, with an upturned edge 8', and a pin or stud 9, secured to and extending down from the central part thereof and adapted to extend into and be supported in a hole or opening 10 in the upper side of the tube 5 and a second hole 11 in the lower side of said tube.

If it is desired to heat a glass or cup of liquid or other material, it is simply placed on the plate 8 and supported thereon, and the heat through the tube 1 will pass up, under, and around the plate 8 to quickly heat the contents of the glass or cup.

The advantages of my heating device will be readily appreciated by those skilled in the art. It is of very simple construction and can be used on any ordinary gas-burner to heat and at the same time hold curling-irons or other tools, which can be heated more or less, as desired, by inserting them partially or fully into the tube 5.

By means of the plate 8 a glass or cup or dish can be held and the contents thereof quickly heated.

It will be understood that the details of construction of my heating device may be varied, if desired, and it may be used for any purpose in connection with gas, kerosene, or other burners.

Having thus described my invention, what I claim as new, and desire to secure by Letters Patent, is—

In a heating device, the combination with a tube adapted to fit on a burner at its lower end, and extend in a vertical plane, and provided with draft-openings near its lower end, and a stand or support secured on the upper end of said tube, of a second tube extending over the first-mentioned tube in a horizontal plane, and supported in said stand, and a plate or support above said horizontal tube and provided with a downwardly-extending pin or stud, which extends into and is held in holes in the horizontal tube, substantially as described.

WALTER H. BRUCE.

Witnesses:
J. C. DEWEY,
M. J. GALVIN.